United States Patent [19]

Csapo et al.

[11] Patent Number: 5,887,261
[45] Date of Patent: Mar. 23, 1999

[54] METHOD AND APPARATUS FOR A RADIO REMOTE REPEATER IN A DIGITAL CELLULAR RADIO COMMUNICATION SYSTEM

[75] Inventors: John Csapo, Glenview; Brian Cheng-Jean Chen, Naperville; Kenneth Blake Hallman, Arlington Heights, all of Ill.

[73] Assignee: Motorola, Inc., Schaumburg, Ill.

[21] Appl. No.: 301,150

[22] Filed: Sep. 6, 1994

Related U.S. Application Data

[63] Continuation of Ser. No. 860,872, Mar. 31, 1992, abandoned.

[51] Int. Cl.$^6$ .................................................. H04Q 07/22
[52] U.S. Cl. ........................ 455/450; 455/15; 455/17; 455/20; 455/524; 455/561
[58] Field of Search ........................ 455/33.1, 33.2, 455/54.1, 54.2, 56.1, 11.1, 17, 20, 237.1, 7, 15, 16, 21, 22, 23, 422, 444, 446–449, 450–453, 524, 525, 561; 370/315, 319–321

[56] References Cited

U.S. PATENT DOCUMENTS

| | | | |
|---|---|---|---|
| 3,737,774 | 6/1973 | Verhagen | 455/234.1 |
| 4,128,740 | 12/1978 | Graziano | 455/33.1 |
| 4,578,815 | 3/1986 | Persinotti | 455/15 |
| 4,718,108 | 1/1988 | Davidson et al. | 455/20 |
| 4,893,349 | 1/1990 | Eastmond et al. | 455/205 |
| 5,038,399 | 8/1991 | Bruckert | 455/33.2 |
| 5,278,991 | 1/1994 | Ramsdale et al. | 455/444 |
| 5,442,681 | 8/1995 | Kotzin et al. | 455/15 X |

FOREIGN PATENT DOCUMENTS

PCT/EP90/
00158  12/1990  Italy.

*Primary Examiner*—Wellington Chin
*Assistant Examiner*—Philip J. Sobutka
*Attorney, Agent, or Firm*—Heather L. Creps

[57] ABSTRACT

A digital cellular radio communication system having a remote repeater is provided. The communication system includes a central communication site which: transmits and receives signals in a first radio channel assigned according to a cellular communication system channel reuse plan, transmits signals to and receives signals from a cellular communication network unit, and digitally processes received signals for subsequent transmission in the first radio channel or to the cellular communication network unit. The communication system further includes a remote communication site, substantially remotely located from the central communication site, which: receives a signal in either the first radio channel or a second radio channel assigned according to the cellular communication system channel reuse plan, channel shifts the received signal between the first and the second radio channels, and transmits the shifted signal in the other of the first and the second radio channels.

15 Claims, 4 Drawing Sheets

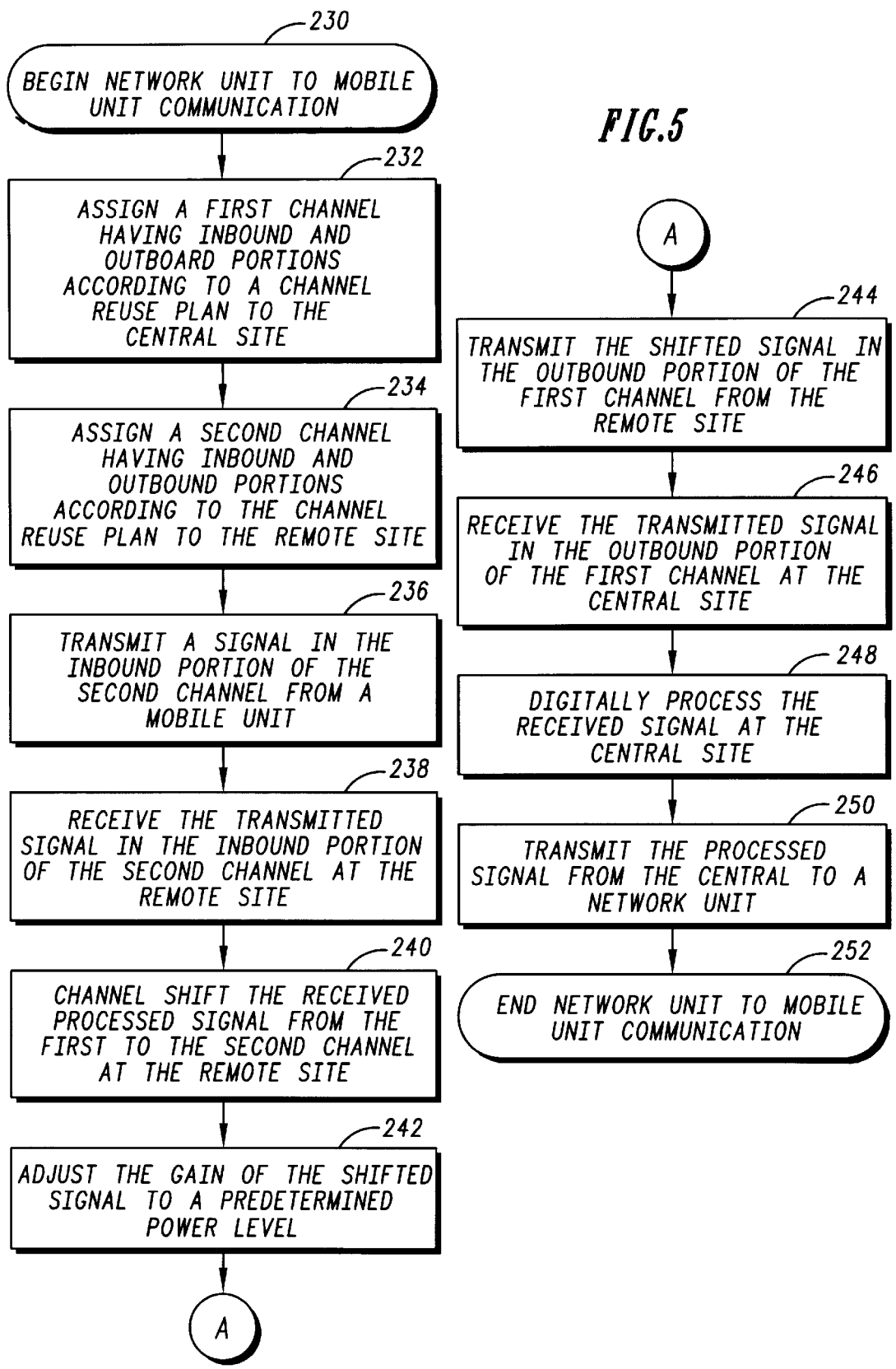

METHOD AND APPARATUS FOR A RADIO REMOTE REPEATER IN A DIGITAL CELLULAR RADIO COMMUNICATION SYSTEM

RELATED APPLICATIONS

The present application is a continuation of application Ser. No. 07/860,872, filed Mar. 31, 1992, and entitled "METHOD AND APPARATUS FOR A RADIO REMOTE REPEATER IN A DIGITAL CELLULAR RADIO COMMUNICATION SYSTEM", now abandoned.

FIELD OF THE INVENTION

The present invention relates to cellular radio communication systems and, more particularly, to a method and apparatus for using radio remote repeater mechanisms in a digital cellular radio communication system.

BACKGROUND OF THE INVENTION

Cellular radio communication systems typically include a number of central communication base sites. Each central communication site has a service area coverage for servicing mobile communication units within the service area. The service areas typically are arranged such that adjacent remote base site service coverage areas overlap in a manner that provides a substantially continuous service region. The substantially continuous service region provides uninterrupted service by handing off mobile communication units from one base site serving a service area to an adjacent base site serving another service area.

Communication between the central communication sites and mobile communication units typically occurs on a pair of frequency channels (i.e., transmit and receive frequencies) assigned according to a cellular communication system channel reuse plan. Upon activation, a mobile communication unit searches a radio frequency spectrum for control signal trasmissions from a local central communication site. The control signal transmissions from the local communication site are found in a radio frequency broadcast control channel (BCCH). The BCCH contains specific informationneeded by the mobile communication unit in order to format and code radio communication system access requests to the local central communication site. The Group Special Mobile (GSM) Pan-European cellular communication system, as specified in GSM recommendations by Motorola available from the European Telecommunication Standards Institute (ETSI) and incorporated herein by reference, is an example of a system using such a format including the BCCH.

On the BCCH many control tranmissions are transmitted including timing information, a local central communication site ID for the central communication site which is transmitting the information, format information for specifying the format of transmit access requests, and may further include in some environments information identifying frequencies on which to transmit such access requests. In addition, the formatting information may further identify the communication system as a time division multiple access (TDMA) system and may identify a time slot in which to transmit an access request.

The mobile communication unit upon detecting and decoding information received on a BCCH subsequently transmits an access request to a local central communication site. The local central communication site, upon receiving the access request from the mobile communication unit subsequently responds by transmitting a signal directed to the mobile communication unit which identifies a resource which it can use for communication with the local central communication site.

To limit noise in cellular communication systems due to communication between other mobile communication units in other nearby service areas serviced by other central communication sites as well as increase the capacity of the cellular communication system, reuse of the available, but limited number of communication resources is done within a service region of the cellular communication system. To ensure that the reuse of communication resources does not cause unacceptable noise in the communication channel, central communication sites which are allocated the same communication resources are geographically separated. By having sufficient geographic separation, the noise in the communication channel is limited. However, the geographic separation needs to ensure an adequate signal to noise ratio (negligible noise in the communication channel) limits the capacity of the communication system because not all of the available communication resources may be used in each service area.

To enhance the efficiency of communication resource reuse and to improve capacity of the cellular communication system, service areas of central communication sites can be divided into sectors, wherein each sector a percentage of the available communication resources, (i.e., communication channels). By having the service area divided into sectors, the required geographic separation may be reduced while maintaining an adequate signal to noise ratio. For example, U.S. Pat. No. 4,128,740, assigned to Motorola, Inc. discloses a four cell (service area)—six sector communication resource reuse pattern. As disclosed, each cell is divided into six sectors and each sector contains approximately ½4th of the available communication resources. For every four cell sites, the communication resource reuse pattern is repeated. This communication resource reuse pattern may be further reduced to a 1 cell site reuse pattern as disclosed in pending U.S. patent application Ser. No. 07/459,624 which was filed Jan. 2, 1990 and also assigned to Motorola, Inc. It will be appreciated by those skilled in the art many other reuse patterns exist for use in cellular communication systems including but not limited to 3, 7, 21, 49, 63, 91 site reuse patterns.

After allocating a communication resource for use by the mobile communication unit, the local central communication site typically allocates a transceiver typically located at the local central communication site to service any subsequent communication with the mobile communication unit on the assigned communication channel resource. The transceiver of the central communication site will subsequently route the communications of the mobile communication unit to a target communication unit. The target communication unit maybe either another mobile communication unit within the same service area, a mobile communication unit in another service area, or a subscriber on the public switched telephone network (PSTN).

High density cellular communication systems with sufficient spectrum can serve a large number of users in an urban environment by using microcells which service a small geographic area. However, in lower user density like rural or suburban areas, higher signal propagation losses and high infrastructure costs severly limit the economic viability of such communication systems. Since providing service coverage to rural, suburban and urban environments alike is crucial in establishing a complete cellular service, the need for a less costly means of deploying a cellular communication system is large.

Another consideration is that due to increasing competition for frequency spectrum, the service coverage areas of central communication sites may have to be reduced to allow for frequency reuse in a relatively close proximity. Reducing the service coverage area of a central communication site, on the other hand, increases the number of central communication sites necessary to cover a given geographic area. Therefore, it is desireasble to minimize the cost of the individual central communication sites equipment so that the overall cost of the cellular communication system can be reduced.

SUMMARY OF THE INVENTION

The present invention overcomes the above-mentioned communication system cost problems by effectively trading radio frequency spectrum, which is typically abundant in low communication traffic density areas, for a less expensive way to serve a larger geographic area. The present invention provides a digital cellular radio communication system having a remote repeater and a central communication site. The central communication site transmits and receives signals in a first radio channel assigned according to a cellular communication system channel reuse plan, transmits signals to and receives signals from a cellular communication network unit, and digitally processes received signals for subsequent transmission in the first radio channel or to the cellular communication network unit. The remote repeater (i.e., remote communication site), which is substantially remotely located from the central communication site, receives a signal in either the first radio channel or a second radio channel assigned according to the cellular communication system channel reuse plan, channel shifts the received signal between the first and the second radio channels, and transmits the shifted signal in the other of the first and the second radio channels.

As a result of this configuration of the communication system, the hardware and software needs of the remote communication sites is less than the central communication sites because the remote communication site does not need to have a mechanism for communicating with the cellular communication network unit or a mechanism for digitally processing received signals. Therefore, the monetary cost of a the remote communication sites is reduced and as such the overall cost of the communication system can be reduced by using these less expensive remote communication sites in conjunction with central communication sites in low communication traffic density areas.

BRIEF DESCRIPTION OF THE DRAWINGS

FIG. 5 shows flowchart of how a signal travels from a mobile communication unit to a cellular communication network unit in the preferred embodiment digital cellular radio communication system.

DETAILED DESCRIPTION

Figure 1:
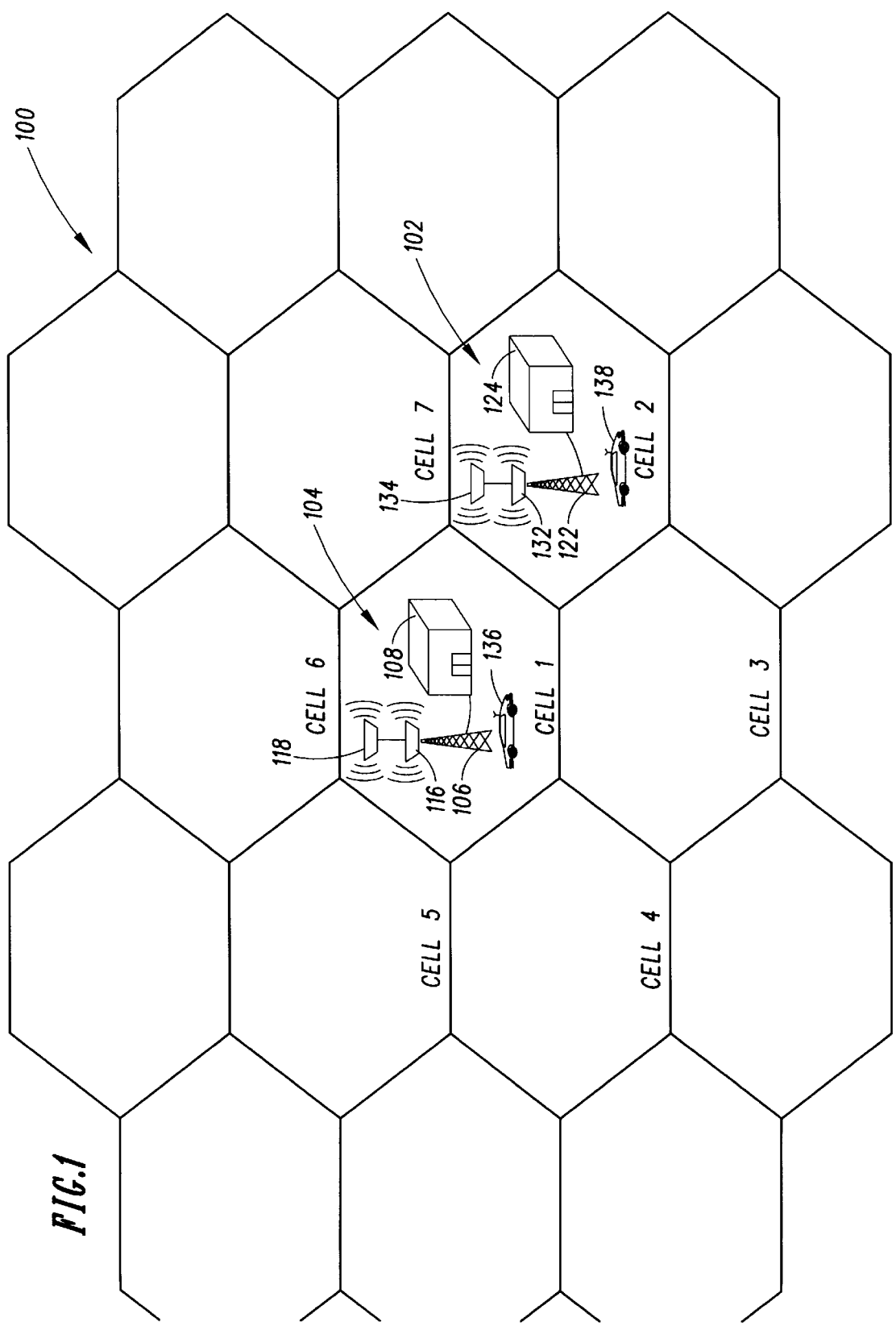
FIG. 1 is a diagram showing a preferred embodiment digital cellular radio communication system.
Figure 2:
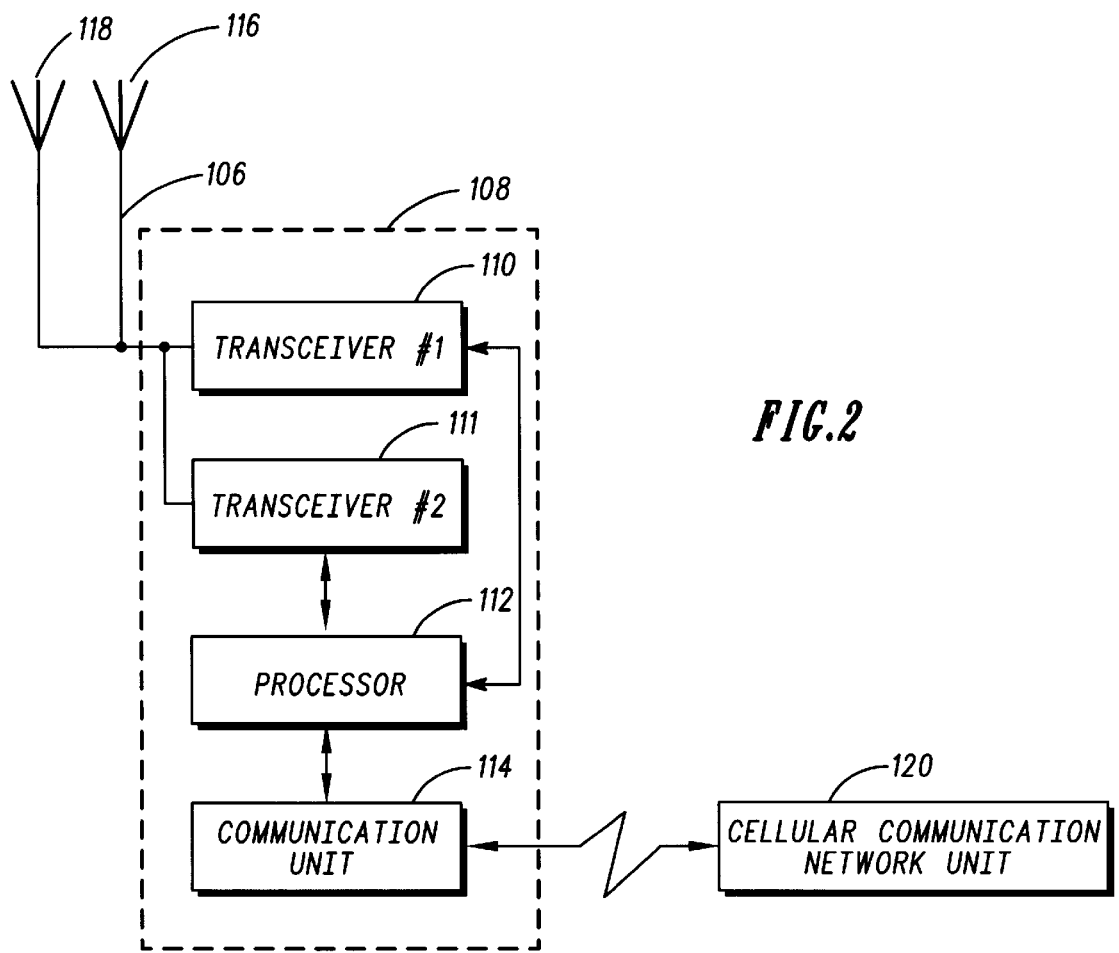
FIG. 2 is a diagram showing a preferred embodiment central communication site.

Referring now to FIG. 1, a preferred embodiment digital cellular radio communication system 100 having remote repeaters 102 is shown. The communication system 100 includes at least one central communication site 104. The central communication site 104 contains an antenna tower 106 and a site equipment storage unit 108. As shown in FIG. 2, the site equipment storage unit 108 preferably includes a transceiver mechanism 110, transceiver mechanism 111, communication unit 114, and a processor apparatus 112.

The transceiver mechanism 110 is operably connected to the antenna tower 106 to which an antenna 118 is preferably mounted so that the transceiver 110 can transmit and receive signals in a first radio channel through antenna 118. Antenna 118 may be an omni-directional antenna, sectorized antenna array, or a narrow beam antenna. It will be appreciated by those skilled in the art that the best type of antennae varies depending on the particular installation environments. In the preferred embodiment antenna 118 is an omni-directional antenna. In addition, it will be well understood by those skilled in the art that a radio channel refers to a pair of channel bands used for a communication link by two communication devices. For the following discussion this pair of channel bands will be designated from the perspective of the central communication site 104. More precisely, the portion of the first radio channel used for transmitting messages to the central communication site 104 will be designated as the inbound portion of the first channel. Similarly, the portion of the first radio channel used for transmitting messages from the central communication site 104 will be designated as the outbound portion of the first channel. It will be appreciated by those skilled in the art that the first radio channel may be any one of several types of radio channels including, but not limited to, code division channels (e.g., direct sequence and frequency hopping spread spectrum channels), time division channels (e.g., GSM-based channels), and frequency division channels. For simplicity, the remainder of the detailed description will be described using frequency divided channels. The preferred embodiment transceiver mechanism 110 preferably is capable of transmitting a signal in the outbound portion of the first radio channel and is capable of receiving a signal in the inbound portion of the first radio channel.

The transceiver mechanism 111 (hereinafter cross-transceiver 111) is operably connected to the antenna tower 106 to which an antenna 116 is preferably mounted so that the cross-transceiver 111 can transmit and receive signals in a second radio channel through antenna 116. Antenna 116 may be an omni-directional antenna, sectorized antenna array, or a narrow beam antenna. In the preferred embodiment antenna 116 is an omni-directional antenna. In addition, the portion of the second radio channel used for transmitting messages to the central communication site 104 will be designated as the inbound portion of the second channel. Similarly, the portion of the second radio channel used for transmitting messages from the central communication site 104 will be designated as the outbound portion of the second channel. The preferred embodiment cross-transceiver mechanism 111 preferably is capable of transmitting a signal in the inbound portion of the first radio channel and is capable of receiving a signal in the outbound portion of the first radio channel.

The use of two omni-directional antenna on an antenna tower 106 will typically result in some mutual interference. Thus, the two antenna 116, 118 must be mounted on the antenna tower 106 at differing heights and additional filtering in the transceivers 110, 111 may be needed to achieve a high quality radio links.

The communication unit 114 preferably is operably connected to a cellular communication network unit 120 such that the unit 120 can transmit signals to and receive signals from the network unit 120. The communication network unit 114 may be a base communication site controller, another central communication site or a communication system switch (e.g., PSTN switch).

Processor apparatus 112 is operatively coupled to the transceiver mechanism 110, the cross-transceiver mechanism 111 and the communication unit 114 such that the processor 112 can digitally process a signal received by either the transceiver 110, the cross-transceiver 111, or the communication unit 114 and subsequently provide the processed signal to one of the devices which did not send the signal to the processor 112 (i.e., either the transceiver 110, cross-transceiver 111, or the communication unit 114).

Figure 3:
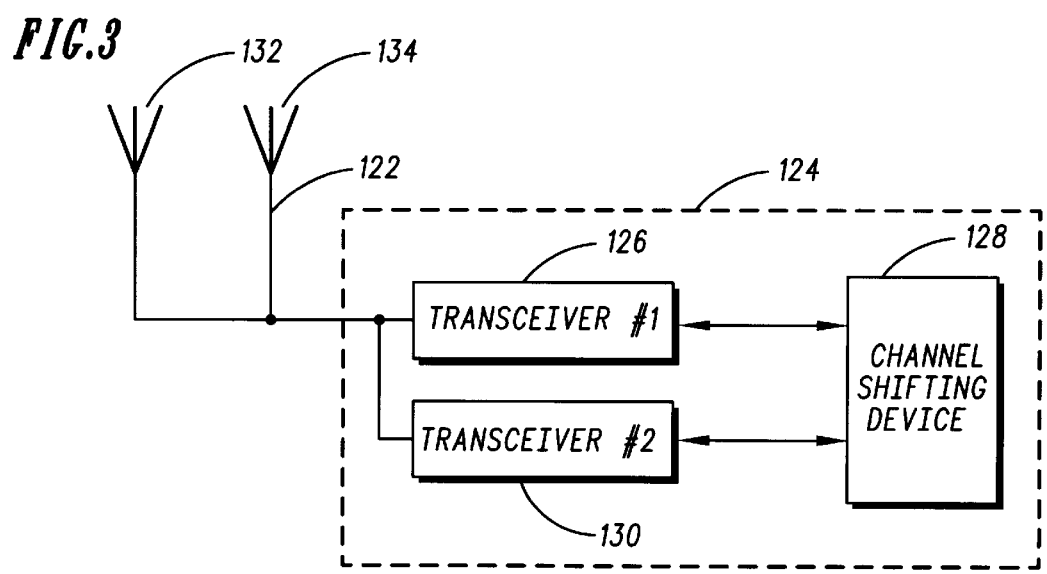
FIG. 3 is a diagram showing a preferred embodiment remote communication site.

The communication system 100 also includes at least one remote communication site 102 which is substantially remotely located from the central communication site 104. The remote communication site 102 contains an antenna tower 122 and a site equipment storage unit 124. As shown in FIG. 3, the site equipment storage unit 124 preferably includes a first transceiver mechanism 126, a channel shifting device 128, and a second transceiver mechanism 130.

The first transceiver mechanism 126 is operably connected to the antenna tower 122 to which an antenna 132 is preferably mounted so that the transceiver 126 can transmit and receive signals in the first radio channel through antenna 132. Antenna 132, like antenna 116, may be an omni-directional antenna, sectorized antenna array, or a narrow beam antenna. In the preferred embodiment antenna 132 is an omni-directional antenna configured such that a signal transmitted from antenna 132 will appear to the central communication site 104 to be from another central communication unit within cell 1 and configured such that a signal transmitted by antenna 116 can be received at remote communication site 102. The preferred embodiment first transceiver mechanism 126 preferably is capable of transmitting a signal in the outbound portion of the first radio channel and is capable of receiving a signal in the inbound portion of the first radio channel.

The second transceiver mechanism 130 is operably connected to the antenna tower 122 to which an antenna 134 is preferably mounted so that the transceiver 130 can transmit and receive signals in a second radio channel through antenna 134. Antenna 134, like antenna 116, may be an omni-directional antenna, sectorized antenna array, or a narrow beam antenna. In the preferred embodiment antenna 134 is an omni-directional antenna configured such that a signal transmitted from antenna 134 can be received by a mobile communication unit 138 within cell 2 and configured such that a signal transmitted by mobile communication unit 138 can be received at remote communication site 102. The preferred embodiment second transceiver mechanism 130 preferably is capable of transmitting a signal in the outbound portion of the second radio channel and is capable of receiving a signal in the inbound portion of the second radio channel.

The use of two omni-directional antenna 132,134 on an antenna tower 122 will typically result in some mutual interference. Thus, the two antenna 132,134 must be mounted on the antenna tower 122 at differing hieights and additional filtering in the transceivers 126,130 may be needed to achieve a high quality radio links.

It will be appreciated by those skilled in the art that the functionality of transceivers 126 and 130 could be incorporated into a single transceiver mechanism. Similarly, function performed by antenna 132 and 134 could be provided by a single antenna. These two possible combinations of elements in remote communication site 102 could be readily implemented if TDMA or CDMA type radio channels were used such that two or more time slots of a time frame or two or more code divided channels in a wide band signal burst could be transmitted or received by a single set of devices.

The channel shifting device 128 shifts the received signal between the first and the second radio channels. The channel shifting device 128 shifts a received signal in the inbound portion of the first radio channel to the outbound portion of the second radio channel. Likewise, the channel shifting device 128 shifts a received signal in the inbound portion of the second radio channel to the outbound portion of the first radio channel. The channel shifting device 128 may also include an automatic gain control circuitry for adjusting the gain of the received signal to a predetermined power level. This gain control circuitry would insure that a signal transmitted by the first and/or the second transceiver mechanism 126,130 would have adequate signal power. Thus, when mobile communication unit 138 is near the remote communication site 104, the transmitted signal power could be attenuated. In addition, when mobile communication unit 138 is far from the remote communication site 104, the transmitted signal power could be increased.

It will be appreciated by those skilled in the art that substantial cost savings in the cellular communication system infrastructure can be achieved through the use of these preferred embodiment remote communication sites 102. This cost savings is due in part to the elimination of processor 112 and communication unit 114 as well as the associated connections to a cellular communication network unit 120.

The communication system 100 also includes mobile communication unit 136 or 138 which is substantially remotely located from the central communication site 104 and substantially remotely located from the remote communication site 102. The mobile communication unit 136,138 contains transceiver mechanism. The transceiver mechanism preferably is operably configured transmit and receive signals in the first and the second radio channels. The preferred embodiment mobile unit transceiver mechanism preferably is capable of receiving a signal in the outbound portion of either the first or the second radio channels, determining in which radio channels the signal was received, and transmitting a signal in the inbound portion of the determined radio channel. Thus, the mobile transceiver can directly communicate with the first transceiver 110 of the central communication site 104 and the first 126 and the second 130 transceiver of the remote communication site 102.

One particularly important aspect of using remote communication sites (e.g., site 102) which frequency shift and repeat a signal transmitted by a central communication site (e.g., site 104) is communication channel reuse. The specific first and second radio channels preferably are assigned according to a cellular communication system channel reuse plan based upon a channel reuse pattern (e.g., 3-site, 4-site, 7-site, 21-site, 49-site, 63-site or 91-site channel reuse patterns). Depending on the particular channel reuse plan used, the radio channel assigned to the first radio channel may be substantially similar to the radio channel assigned to the second radio channel. Also, the radio channel assigned to the first radio channel may be substantially different from the radio channel assigned to the second radio channel.

Each central communication site 104 can be configured to extend communication traffic control to remote communication sites in each of the surrounding cells (i.e., cell 2–cell 7). Depending upon the particular channel reuse plan used, the radio channel assigned to the first radio channel (associated with the central communication site 104) may be substantially similar to or different from the radio channel assigned to the second radio channel (associated with the remote communication site 102) and may be substantially similar to or different from the radio channel assigned to the other second radio channels (associated with the other remote communication sites found in cells 3, 4, 5, 6, and 7 which are also served by the central communication site 104).

For example, each served remote site may operate with respect to a second radio channel which is assigned according to the cellular communication system channel reuse plan and is substantially different from the first radio channel and is substantially different from the second radio channel assigned to each other remote communication site.

Further, each served remote site may operate with respect to a second radio channel which is assigned according to the cellular communication system channel reuse plan and is substantially different from the first radio channel and is substantially similar to the second radio channel assigned to each other remote communication site.

Furthermore, each remote site may operate with respect to a second radio channel which is assigned according to the cellular communication system channel reuse plan and is substantially similar to the first radio channel and is substantially similar to the second radio channel assigned to each other remote communication site.

Finally, each remote site may operate with respect to a second radio channel which is assigned according to the cellular communication system channel reuse plan and is substantially similar to the first radio channel and is substantially different from the second radio channel assigned to each other remote communication site.

Figure 4:
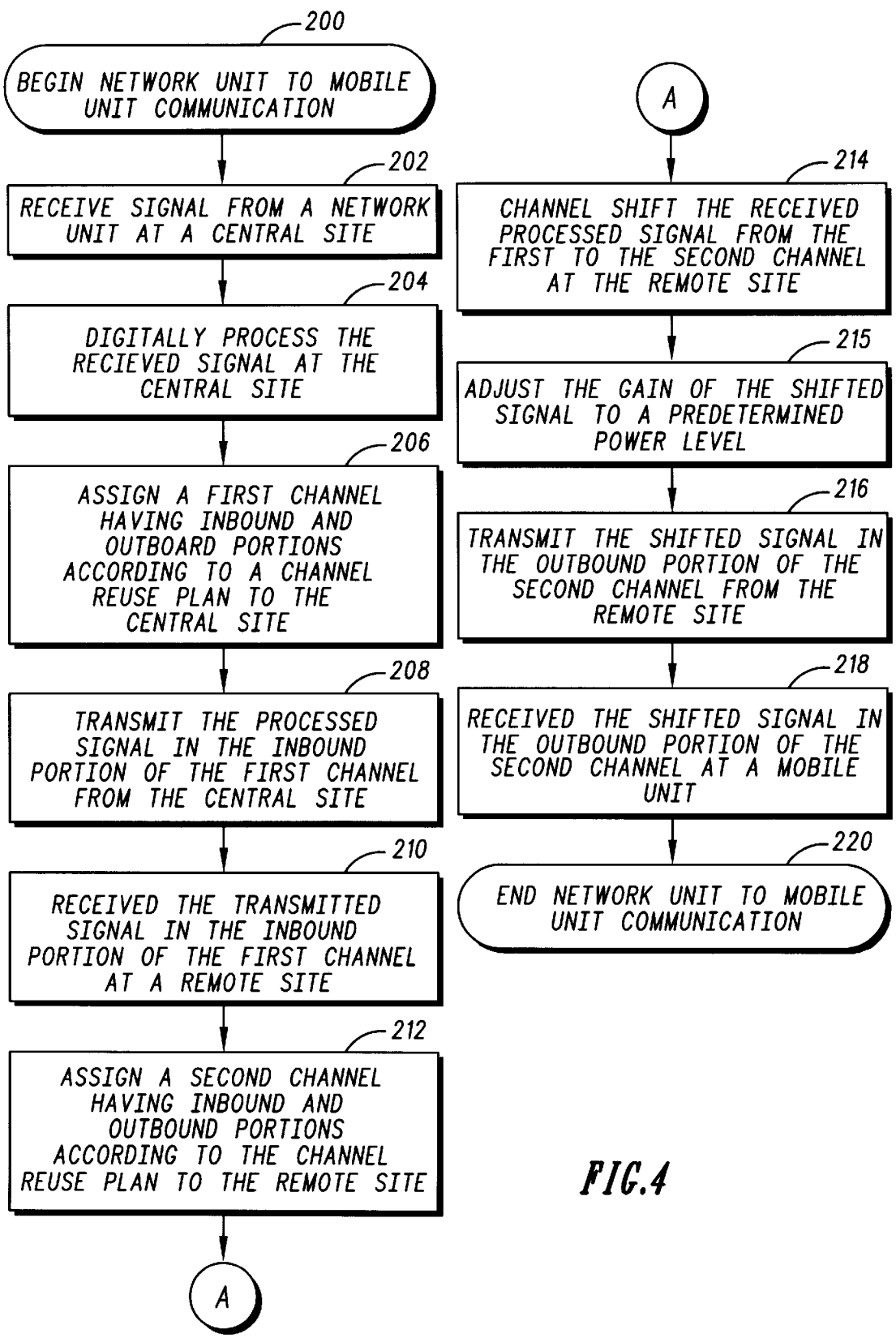
FIG. 4 shows flowchart of how a signal travels from a cellular communication network unit to a mobile communication unit in the preferred embodiment digital cellular radio communication system.

By way of example, FIG. 4 shows flowchart describing how a signal preferably travels from the cellular communication network unit 120 to mobile communication unit 138. The process begins 200 at a cellular communication network unit 120 when a signal is sent to a central communication site 104. The central communication site 104 receives 202 the signal from the cellular communication network unit 120. The central communication site 102 digitally processes 204 the received signal. In addition, a first radio channel is assigned 206 according to a cellular communication system channel reuse plan to the central communication site 104. This first radio channel has inbound and outbound radio channel portions. The central communication site 104 transmits 208 the processed signal in the inbound portion of the first radio channel. Subsequently, a remote communication site 102, which is substantially remotely located from the central communication site 104, receives 210 the transmitted signal in the inbound portion of the first radio channel. In addition, a second radio channel is assigned 212 according to the cellular communication system channel reuse plan to the remote communication site 102. This second radio channel also has inbound and outbound radio channel portions. Subsequently, the received signal is channel shifted 214 from the first radio channel to the second radio channel at the remote communication site 102. The gain of the shifted signal is adjusted 215 to a predetermined power level. Then, the remote communication site 102 transmits 216 the shifted signal in the outbound portion of the second radio channel. Finally, the shifted signal is received 218 in the outbound portion of the second radio channel at a mobile communication unit 138 which ends 220 the process.

By way of example, FIG. 5 shows flowchart describing how a signal preferably travels from mobile communication unit 138 to the cellular communication network unit 120. The process begins 230 at a mobile communication unit 138. A first radio channel is assigned 232 according to a cellular communication system channel reuse plan to a central communication site 104. The first radio channel has inbound and outbound radio channel portions. A second radio channel is assigned 234 according to the cellular communication system channel reuse plan to a remote communication site 102 which is substantially remotely located from the central communication site 104. The second radio channel has inbound and outbound radio channel portions. The mobile communication unit 138 transmits 236 a signal in the inbound portion of the second radio channel. The remote communication site 102 receives 238 the signal in the inbound portion of the second radio channel. Subsequently, the received signal is channel shifted 240 from the second radio channel to the first radio channel at the remote communication site 102. The gain of the shifted signal is adjusted 242 to a predetermined power level. Then, the remote communication site 102 transmits 244 the shifted signal in the outbound portion of the first radio channel. The central communication site 104 receives 246 the transmitted signal in the outbound portion of the first radio channel. The received signal is digitally processed 248 at the central communication site 104. Finally, the processed signal is transmitted 250 from the central communication site 104 to a cellular communication network unit 120 which ends 252 the process.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed.

What is claimed is:

1. A cellular communication system comprising:

a central transceiver operable for transmitting and receiving radio frequency signals on traffic channels with a first mobile communication unit operating within a first coverage area and with a remote transceiver and for communicating with a cellular communication network, a traffic channel comprising a transmit data slot for transmitting signals and a receive data slot for receiving signals, the remote transceiver being operable for transmitting and receiving radio frequency signals on traffic channels with a second mobile communication unit operating in a second coverage area remotely located from the central transceiver and with the central transceiver, wherein both the remote transceiver and the first mobile communication unit operating in the first coverage area are responsive to the central transceiver via a first radio frecuency control channel;

a controller associated with the central transceiver operable to assign via the first radio frequency control channel traffic channels for radio frequency communication between the central transceiver and either of the remote transceiver or the first mobile communication unit operating within the first coverage area; and a controller associated with the remote transceiver operable to assign via a second radio frequency control channel a first traffic channel for radio frequency communication between the remote transceiver and the second mobile communication unit operating within the second coverage area and operable to request the central transceiver to assign a second traffic channel for radio frequency communication between the central transceiver and the remote transceiver, wherein the mobile communication unit operating in the second coverage area exchanges signals with the remote transceiver on the first traffic channel and the signals are further communicated to the central transceiver via the second traffic channel.

2. The cellular communication system of claim 1 wherein the data slots are time division multiple access (TDMA) time slots.

3. The cellular communication system of claim 1 wherein the data slots are code division multiple access (CDMA) code slots.

4. The cellular communication system of claim 1 wherein the central transceiver receives signals from the remote transceiver in the transmit data slot.

5. The cellular communication system of claim 1 wherein the central transceiver transmits signals to the remote transceiver in the receive data slot.

6. The cellular communication system of claim 1 wherein the remote transceiver receives signals from the central transceiver in the transmit data slot.

7. The cellular communication system of claim 1 wherein the remote transceiver transmits signals to the central transceiver in the receive data slot.

8. The cellular communication system of claim 1 further comprising a plurality of remote transceivers, each remote transceiver being operable for transmitting and receiving signals on communication channels within an associated coverage area remotely located from the central communication site and with the central communication site.

9. The cellular communication system of claim 8 further comprising a common communication channel for mobile communication units operating in the first coverage area or the remote transceivers to request assignment of a communication channel from the central transceiver.

10. The cellular communication system of claim 9 further comprising a common communication channel for mobile communication units operating in the coverage areas of the remote transceivers to request assignment of a communication channels from the remote transceivers.

11. A method of extending a cellular communication system comprising:

(a) receiving at a remote transceiver a request for a communication channel assignment from a first mobile communication unit operating within a coverage area of the remote transceiver;

(b) in response to the request for the communication channel assignment, assigning a first communication channel for communication between the remote transceiver and the first mobile communication unit;

(c) sending from the remote transceiver a request for communication channel assignment to a central transceiver via a control channel, the control channel being used for communicating the communication channel assignment between the central transceiver and the remote transceiver and being used for communicating the communication channel assignment between the central transceiver and a second mobile communication unit operating within a coverage area of the central transceiver;

(d) receiving at the central transceiver the request for the communication channel assignment from the remote transceiver and in response to the request for the communication channel assignment, assigning a second communication channel for communication between the central transceiver and the remote transceiver;

(e) transmitting signals from the first mobile communication unit to the remote transceiver in a first data slot of the first communication channel;

(f) transmitting the signals received from the first mobile communication unit at the remote transceiver to the central transceiver in a first data slot of the second communication channel;

(g) transmitting signals from the central communication site to the remote transceiver in a second data slot of the second communication channel; and (f) transmitting signals from the remote transceiver to the first mobile communication unit in a second data slot of the first communication channel.

12. The method of claim 11 wherein the data slots are time division multiple access (TDMA) time slots.

13. The method of claim 11 wherein the data slots are code division multiple access (CDMA) code slots.

14. The method of claim 11 wherein step (a) further comprises receiving on a first common communication channel.

15. The method of claim 11 wherein step (c) further comprises sending on a second common communication channel.

* * * * *